(12) United States Patent
Harasse et al.

(10) Patent No.: US 9,034,453 B2
(45) Date of Patent: May 19, 2015

(54) REINFORCED AIRCRAFT FUSELAGE PANEL AND METHOD OF MANUFACTURE

(75) Inventors: Olivier Harasse, Blagnac (FR); Francois Parreaux-Ey, Muret (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 712 days.

(21) Appl. No.: 12/999,217

(22) PCT Filed: Jun. 22, 2009

(86) PCT No.: PCT/FR2009/051187
§ 371 (c)(1),
(2), (4) Date: May 27, 2011

(87) PCT Pub. No.: WO2010/004159
PCT Pub. Date: Jan. 14, 2010

(65) Prior Publication Data
US 2011/0217510 A1    Sep. 8, 2011

(30) Foreign Application Priority Data
Jun. 26, 2008   (FR) ..................................... 08 54290

(51) Int. Cl.
*B32B 3/24* (2006.01)
*B64C 1/14* (2006.01)

(52) U.S. Cl.
CPC ....... *B64C 1/1446* (2013.01); *Y10T 428/24322* (2015.01); *Y10T 156/1057* (2015.01); *Y02T 50/433* (2013.01)

(58) Field of Classification Search
CPC ........ B64C 1/1446; B64C 1/1461; B64C 1/12
USPC ............ 428/137, 156; 244/119, 120; 156/253
See application file for complete search history.

(56) References Cited

U.S. PATENT DOCUMENTS

| 7,780,808 B2 | 8/2010 | Godbehere et al. |
| 2008/0172959 A1* | 7/2008 | Pellenkoft et al. ............. 52/213 |

FOREIGN PATENT DOCUMENTS

WO        01 58680        8/2001

OTHER PUBLICATIONS

Niu, M. C. Y., "Airframe Structural Design", Hong Kong Conmilit Press Ltd, p. 187, XP-002512107, (Feb. 2002).
International Search Report Issued Jan. 14, 2010 in PCT/FR09/051187 filed Jun. 22, 2009.
French Search Report Issued Jan. 27, 2009 in French Patent Application No. 0854290 filed Jun. 26, 2008.

* cited by examiner

*Primary Examiner* — William P Watkins, III
(74) *Attorney, Agent, or Firm* — Oblon, McClelland, Maier & Neustadt, L.L.P.

(57)   ABSTRACT

A fuselage panel made of composite material having a skin with an opening, at least part of the contour of which is reinforced by an integrated reinforcement made of composite material. The fuselage panel includes at least one liner made of composite material which is attached to and superposed on the reinforced skin portion and participates at least partially in defining the contour of the opening, the panel additionally including consolidating members, each passing at least partially through the liner and at least partially through the reinforced skin portion.

17 Claims, 6 Drawing Sheets

REINFORCED AIRCRAFT FUSELAGE PANEL AND METHOD OF MANUFACTURE

TECHNICAL FIELD

The present invention relates in general to the field of aircraft fuselages comprising an outer skin made of fibrous composite material, and in particular to the field of reinforcing elements made of composite material for an outer skin.

PRIOR ART

Conventionally, an aircraft fuselage comprises panels mounted and fixed around an internal structure so as to form, once assembled, an aerodynamic outer skin.

The internal structure is composed in particular of structural frames regularly distributed over the entire length of the fuselage and arranged transversely to the longitudinal axis of the fuselage, and stringers arranged parallel to the longitudinal axis of the fuselage.

With the aim of reducing as far as possible the weight of the aircraft and thus improving the performance of the vehicle, aircraft manufacturers are trying to use materials that are lighter than the metal materials usually used, while maintaining or improving the mechanical characteristics.

The current choice in the aeronautics field is that of replacing the metallic elements with elements made of composite material comprising a mixture of fibres and resin. This concerns in particular the fuselage panels of the outer skin.

The conventional methods of manufacturing a fuselage panel generally consist in carrying out two successive steps, namely a step of drape moulding followed by a step of consolidation.

The drape moulding step consists in creating a stack of resin-preimpregnated fibre laps or fabrics, with the aim of obtaining a plurality of superposed layers or plies. The step of consolidating the stack consists for its part in obtaining the panel by compacting the assembly consisting of the preimpregnated fibre plies, by applying a pressure or a vacuum. On the other hand, this step of consolidating the stack takes place by firing the latter, for example in an oven or an autoclave, so as to polymerise the preimpregnated resin on the fibres in order to obtain a final compact and one-piece element.

The fuselage of an aircraft is usually subjected to very high mechanical forces, due for example to the weight of the aircraft or to the action of the rudder. These forces may give rise to flexural and/or torsional stresses.

The internal structure of the fuselage has the aim of giving the fuselage the necessary mechanical strength. For instance, the frames ensure the circumferential stiffening of the fuselage, that is to say along the periphery of the fuselage, and the stringers ensure the longitudinal stiffening.

However, the outer skin of an aircraft fuselage usually includes a certain number of openings, for example at the location of the passenger doors, which constitute zones of stress concentration.

FIG. 1 of the appended drawings shows in perspective the front and middle parts of an aircraft 10. The fuselage 20 comprises a plurality of openings, for example for the doors 21 at the front of the fuselage 20 and the doors 22 in the middle of the fuselage 20.

FIG. 2 is a front view of a fuselage panel 30 comprising an opening 40, said panel 30 being mounted fixedly on structural frames 24.

Some openings are subjected to particularly high localised stresses, such as for example the openings corresponding to the passenger doors 22 located in the middle of the fuselage 20 and close to the wing attachment part 23 (FIG. 1).

These openings may then exhibit incipient cracks in the outer skin, which constitutes an unacceptable risk to the aircraft.

The fuselage panels are thus usually reinforced in the area of the openings by means of a local reinforcement that provides the necessary mechanical strength.

The local reinforcement then has on the one hand a given thickness along at least part of the contour of the opening, and on the other hand a surface area that is large enough to correctly distribute the stresses.

One solution consists in providing an integrated reinforcement made of composite material, created from an additional stack of plies arranged along at least part of the contour of the opening during the drape moulding operation.

After the consolidation step, a panel reinforced by the integrated reinforcement is obtained. Thus the panel comprises a skin formed by the first stack of plies, and the integrated reinforcement formed by the second stack of plies. More specifically, the first stack of plies is formed of two secondary stacks superposed on one another, the second stack of plies of the integrated reinforcement being interposed between the two secondary stacks of the skin.

The portion of skin comprising the integrated reinforcement is referred to here as the reinforced skin portion.

The thickness and the surface area of the integrated reinforcement are determined in such a way as to provide the fuselage panel locally with the necessary mechanical strength, thereby preventing any incipient crack in the area of the opening.

However, it is known that a sudden change in thickness of a part made of composite material leads to peeling forces. Peeling results in a coming-apart of the fibre plies, which of course reduces the strength of the part.

In order to minimise these forces, the integrated reinforcement conventionally comprises a ply drop-off, that is to say a bevelled or stepped or graduated arrangement of the plies forming the integrated reinforcement, so as thus to obtain a substantially constant reduction in thickness of the integrated reinforcement. The stresses are then correctly distributed, which makes it possible to avoid the peeling forces.

In addition, the rules for designing parts made of composite material usually recommend creating the ply drop-off with a sufficiently small slope so as to distribute the stresses in the best possible manner.

FIG. 3, which is an enlarged perspective view of part of FIG. 2, shows one example of a panel 30 comprising a skin 31 having a portion reinforced by the integrated reinforcement 50. Here, the integrated reinforcement 50 comprises a first portion 51 of substantially constant thickness and a second portion involving a ply drop-off. The first portion 51 is arranged so as to define at least part of the contour 41 of the opening 40, and the second portion 52 extends from the first portion 51. It should be noted that the first portion 51 may not be present, the second portion 52 then being arranged so as to define at least part of the contour 41 of the opening 40.

FIG. 4 shows a sectional view of the skin 31 of the panel 30 comprising a reinforced skin portion 32, along the axis A-A of FIG. 3.

The skin 31 comprises two secondary stacks 31A and 31B, superposed on one another. An integrated reinforcement 50 is interposed between the two secondary stacks 31A and 31B of the skin 31. The portion of the skin 31 comprising the integrated reinforcement 50 defines the reinforced skin portion 32.

It will be understood that the length of spread of the surface area of the ply drop-off of the integrated reinforcement depends directly on the maximum thickness of said reinforcement and on the value of the slope of said ply drop-off.

However, respecting both a small slope of the ply drop-off and the necessary local thickness, which may be large, leads to a surface area of spread of the ply drop-off that is particularly penalising in terms of weight and size.

SUMMARY OF THE INVENTION

The invention relates mainly to an aircraft fuselage panel comprising an opening, said panel being reinforced along at least part of the contour of said opening, the original design of said panel providing the necessary mechanical strength and a good distribution of stresses while ensuring an economy of weight and a limited size.

The fuselage panel made of composite material comprises a skin having an opening, at least part of the contour of which is reinforced by an integrated reinforcement made of composite material, defining a reinforced skin portion, said integrated reinforcement defining at least part of the contour of said opening and comprising a ply drop-off.

According to the invention, said fuselage panel comprises at least one liner made of composite material which is attached to and superposed on said reinforced skin portion and participates at least partially in defining the contour of the opening, said panel additionally comprising consolidating members, each passing at least partially through said liner and at least partially through said reinforced skin portion.

The fuselage panel thus has a skin portion that is reinforced in the area of the opening, on the one hand by the integrated reinforcement and on the other hand by the liner, providing the necessary mechanical strength and a good distribution of stresses while ensuring an economy of weight and a limited size.

This is because the cumulative thickness of the integrated reinforcement and of the liner attached to the reinforced skin portion provides the desired local mechanical strength.

Furthermore, the stresses to which the liner is subjected are correctly distributed to said reinforced skin portion via the consolidating members. The peeling forces to which the liner is subjected are thus substantially reduced, which makes it possible not to have to create a ply drop-off for the latter. Thus a weight saving is made and the size is limited.

In addition, the length of spread of the surface area of the ply drop-off of the reinforcement depends only on the thickness of said reinforcement and not on the cumulative thickness of the reinforcement and liner. A small slope can then be respected, which on the one hand minimises the peeling forces and correctly distributes the stresses and on the other hand leads to a ply drop-off for which the weight and size are reasonable.

The liner is attached to said reinforced skin portion by attachment techniques known to the person skilled in the art in the field of composite materials, such as for example adhesive bonding, co-curing or lamination.

The consolidating members may thus be arranged at given locations, without it being necessary for example to arrange them at the corners of the opening. This is because the corners of the opening are preferably reinforced by the liner attached to the reinforced skin portion.

Preferably, the liner is assembled to said reinforced skin portion by co-curing. The liner thus has a shape that substantially mates with that of the reinforced skin portion, so that there is substantially no empty space between the liner and the reinforced skin portion. The strength is thus homogeneous across the entire connection surface area between the liner and the reinforced skin portion.

The integrated reinforcement may comprise a first portion of substantially constant thickness, a first edge of which defines at least part of the contour of the opening. It then comprises a second portion involving a ply drop-off, which extends from the first portion.

The maximum thickness of the integrated reinforcement may for example be around 15 mm, and more generally may be between 5 mm and 30 mm.

The thickness of the liner is preferably substantially constant. It may be around 5 mm, and more generally between 5 mm and 30 mm.

The skin of the panel, the integrated reinforcement and/or the liner may be created by stacking woven or unidirectional plies.

In the case of stacking unidirectional plies, the plies may each be oriented in a direction forming an angle $\theta$ relative to the circumferential axis of the panel. The angle $\theta$ may be selected from the following angles 0°, 45°, 90°, −45°. It is noted that the longitudinal and circumferential axes of the panel are defined so as to be substantially parallel, respectively, to the longitudinal and circumferential axes of the fuselage.

Preferably, the resins used for the panel skin, the integrated reinforcement and the liner are of the same nature, for example a thermosetting resin such as a phenolic resin or a resin of epoxy type.

Thus, in the case of assembling the liner to the reinforced skin portion by co-curing, the resin of the liner and that of the reinforced skin portion are polymerised to one another in the connection surface area between these two elements, thus ensuring the attachment of the liner to the reinforced skin portion.

Preferably, the fibres used for the skin, the integrated reinforcement and the liner are of the same nature, for example carbon fibres, glass fibres or aramid fibres.

Preferably, the average slope of said ply drop-off is substantially between $1/50$ and $1/10$.

The slope may be around $1/20$, more generally between $1/10$ and $1/30$, in a direction substantially parallel to the longitudinal or circumferential axis of the panel.

The slope of the ply drop-off may be around $1/40$, more generally between $1/30$ and $1/50$, in a direction that is substantially oblique with respect to the longitudinal and circumferential axes of the panel.

Advantageously, the surface area of said liner is substantially smaller than the surface area of said reinforced skin portion forming a support for said liner. This makes it possible to obtain locally the necessary thickness for the desired mechanical strength. The surface area of the liner is moreover optimised, which limits the weight used and also the size.

Said opening may have a substantially rectangular shape, said liner then being arranged substantially at the corners of said opening.

The contour of the consolidating member is preferably in contact, in at least one section transverse to the longitudinal axis of the consolidating member, with the wall of the hole for housing said consolidating member.

Advantageously, the continuous contact is achieved substantially over the entire length of said consolidating member. The consolidating members then ensure a good transmission of the stresses between the liner and the integrated reinforcement, since there is no clearance between the contour of the consolidating member and the wall of the hole.

Preferably, each consolidating member extends over the entire thickness of the liner and over the entire thickness of the reinforced skin portion of the panel. Each consolidating member may be oriented along an axis that is substantially orthogonal, locally, to the surface of the skin of the panel.

The consolidating members are preferably members comprising a stem, and advantageously members comprising a stem which can expand radially with respect to the longitudinal axis of the stem. For example, these members may be of the rivet, screw and bolt, rod and crimping ring, or "lockbolt" type.

The invention also relates to an aircraft fuselage portion comprising at least one fuselage panel according to any one of the features that have just been defined and at least one structural element of the fuselage, said consolidating members being mounted fixedly on said structural element of the fuselage. Thus, the structural element, for example frames, stringers or lintels, ensures that the forces to which the panel is subjected are taken up in the reinforced part thereof and transmitted by the consolidating members. The mechanical strength of the panel is then particularly improved.

The invention also relates to an aircraft comprising at least one fuselage panel according to any one of the above features and/or at least one fuselage portion according to the above feature.

The invention also relates to a method of manufacturing a fuselage panel made of composite material according to any one of the above features, comprising the following steps:
 a step of creating a stack of preimpregnated fibre plies, comprising
 a plurality of plies intended to form a panel skin, comprising a first set of plies and a second set of plies,
 one or more plies interposed between the first and second sets of plies and intended to form said integrated reinforcement, the plies of the integrated reinforcement and those of the skin defining together a reinforced skin portion, and
 one or more plies arranged on the plies intended to form said reinforced skin portion, and intended to form said liner; then
 a step of consolidating said stack;
 said method also comprising the steps of:
 installing said consolidating members; and
 trimming so as to form said opening.

The first and second sets of plies may each comprise one or more plies.

Preferably, the step of installing the consolidating members comprises a sub-step during which at least part of said consolidating member is expanded radially with respect to its longitudinal axis so as to achieve the continuous contact, in at least one section transverse to its longitudinal axis, of the contour of the consolidating member with the wall of the hole for housing said consolidating member.

The method may additionally comprise a step of attaching said consolidating members to at least one structural element of the fuselage. The consolidating members then carry out the additional function of attaching the panel to said structural element.

Advantageously, all the consolidating members are attached to at least one structural element of the fuselage.

Other advantages and features of the invention will become apparent from the non-limiting detailed description given below.

BRIEF DESCRIPTION OF THE DRAWINGS

Embodiments of the invention will now be described by way of non-limiting examples, with reference to the appended drawings, in which.

DETAILED DESCRIPTION OF A PREFERRED EMBODIMENT

Figure 1:
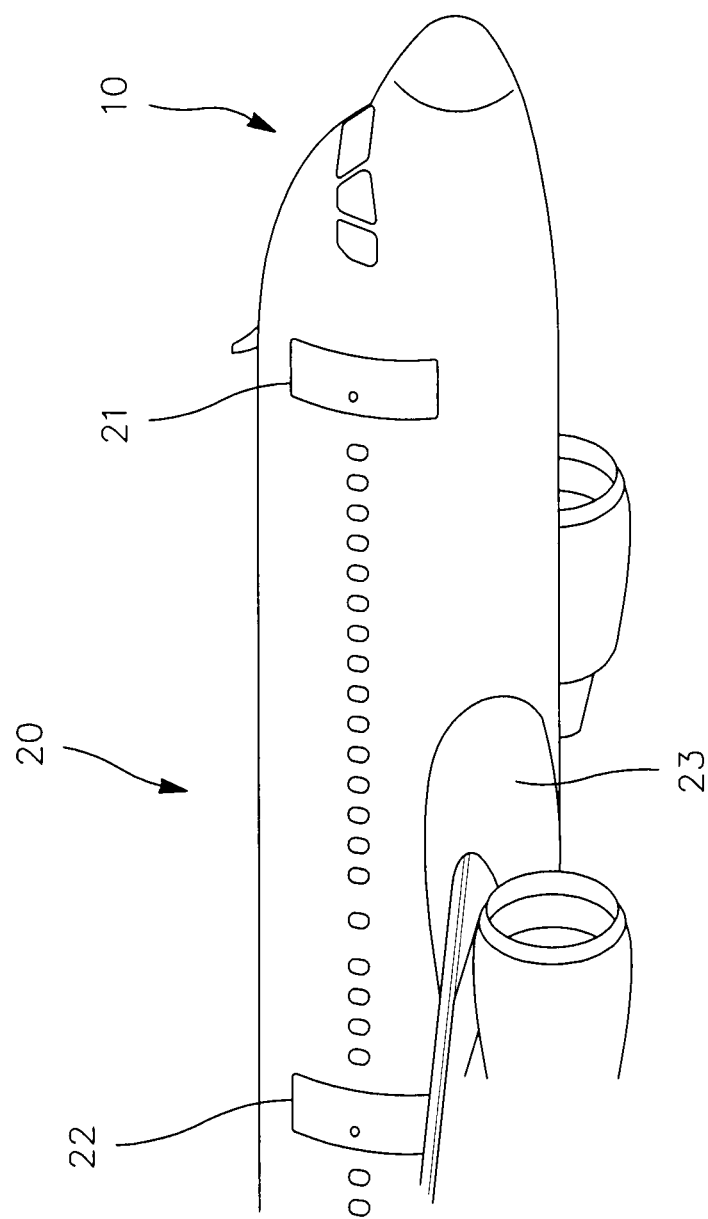
FIG. 1, already described, is a view in perspective and from the side which shows in a highly schematic manner the front and middle parts of an aircraft.
Figure 2:
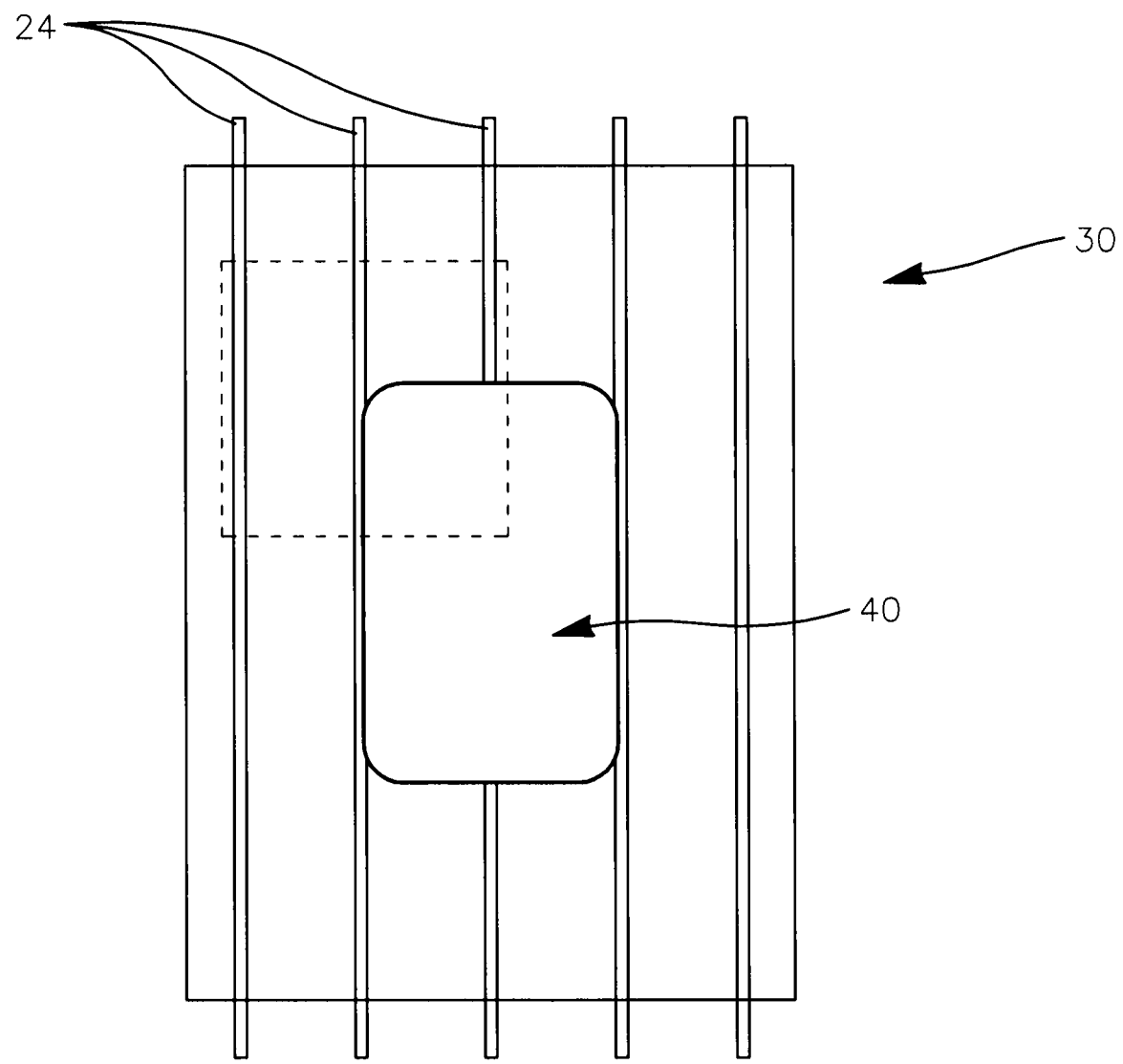
FIG. 2, already described, is a front view of a fuselage panel comprising an opening intended to receive a door frame.
Figure 3:
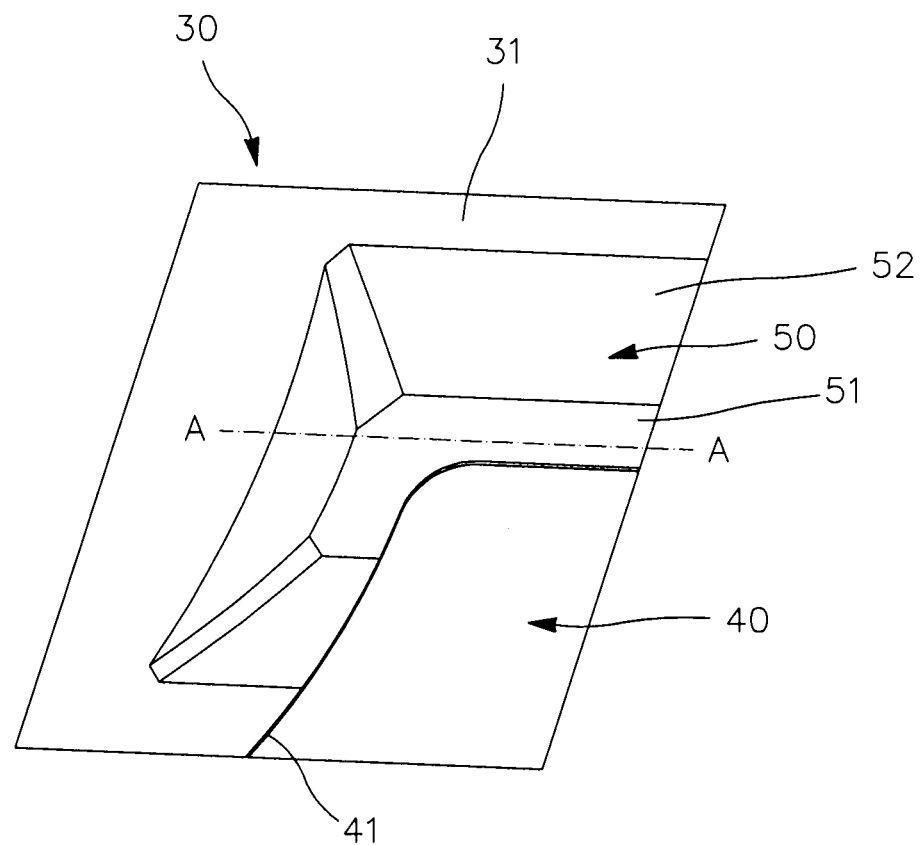
FIG. 3, already described, is an enlarged perspective view of part of FIG. 2, the fuselage panel comprising an integrated reinforcement according to the prior art.
Figure 5:
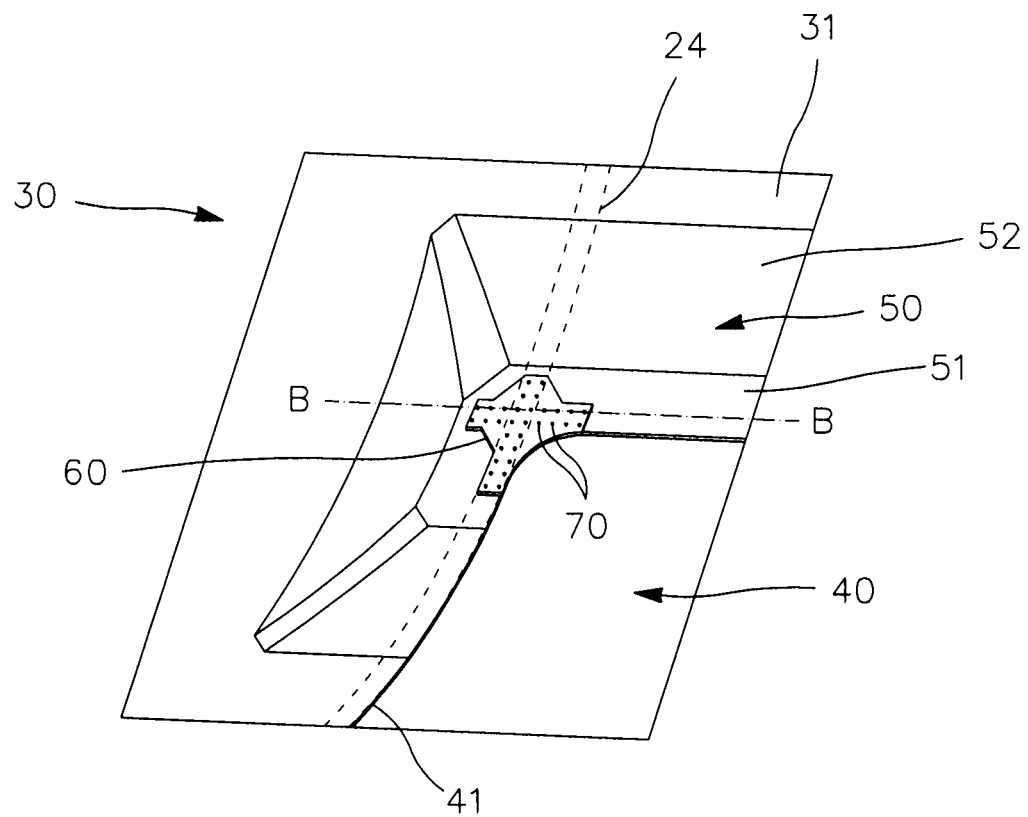
FIG. 5 is an enlarged perspective view of part of FIG. 2, the fuselage panel being reinforced and equipped with a liner according to the preferred embodiment of the invention.

FIG. 5 shows in a perspective view an enlarged part of a fuselage panel 30 made of composite material as shown in FIG. 2. The panel 30 is equipped with a liner according to the preferred embodiment of the invention.

The panel 30 extends along longitudinal and circumferential axes which are substantially parallel, respectively, to the longitudinal and circumferential axes of the fuselage 20.

The panel 30 made of composite material comprises a base skin 31 formed of a consolidated stack of plies of unidirectional fabrics or laps of fibres preimpregnated with an appropriate resin.

At least one opening 40 is provided in the skin 31 of the panel 30, in order to receive for example a passenger door, a hatch or a window.

The opening 40 may have different shapes, in particular substantially rectangular or square, or oval. It is considered that the square shape is a particular case of the more general rectangular shape. In the case of a rectangular shape, the corners may be substantially angular or rounded.

Figure 4:
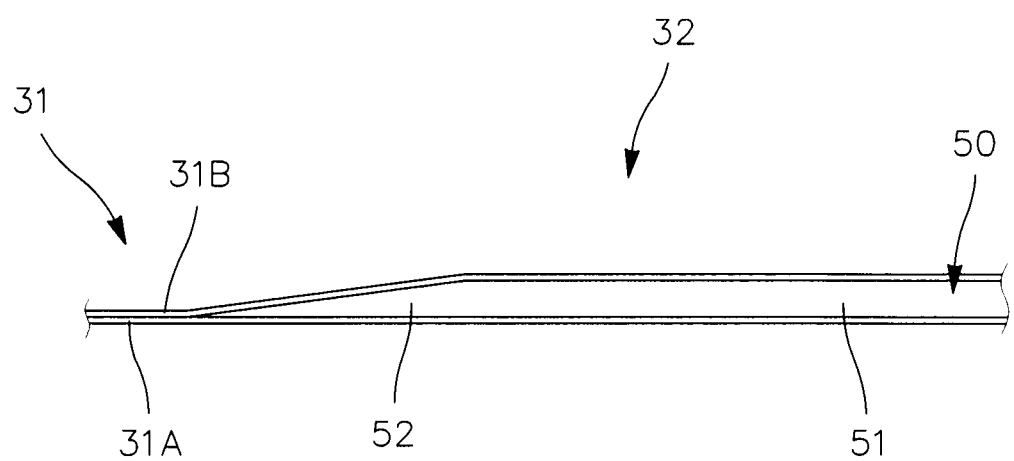
FIG. 4, already described, is a sectional view of the fuselage panel comprising a reinforced skin portion, shown along the axis A-A of FIG. 3.

The skin 31 of the panel 30 comprises a skin portion 32 that is reinforced by an integrated reinforcement 50 made of composite material. This integrated reinforcement is interposed between a first consolidated secondary stack 31A of the skin and a second consolidated secondary stack 31B of the skin, as described above with reference to FIG. 4.

The integrated reinforcement 50 extends preferably over the inner face of the panel 30. The term "inner" is to be understood in the direction of approaching radially the longitudinal axis of the fuselage 20.

The integrated reinforcement 50 comprises, in this embodiment of the invention, a first portion 51 having a substantially constant thickness, defining at least part of the contour 41 of the opening 40. A second portion 52, referred to as the ply drop-off, extends from the first portion 51 and has a thickness that gradually decreases in a direction away from the first portion 51. The second portion 52 may be bevelled or stepped or graduated. The integrated reinforcement 50 thus has a given surface area.

The panel 30 is thus locally reinforced and has a maximum thickness in the part corresponding to the first portion 51 of the integrated reinforcement 50.

It should be noted that the first portion 51 may not be present. Thus the integrated reinforcement 40 comprises a ply drop-off 52 arranged so as to define at least part of the contour 41 of the opening 40. The maximum thickness of the ply drop-off is then located in the area of the contour 41 of the opening 40.

In the case of an opening 40 of substantially rectangular shape, the integrated reinforcement 50 may be arranged on the entire contour 41 of the opening 40. It may also be arranged on at least part of the contour, such as in particular the upper part (FIG. 5) and/or the lower part of the contour 41.

The ply drop-off portion 52 extends along the skin 31 over a surface area having a length of spread that depends on one hand on the thickness of the first portion 51 of the integrated reinforcement 50 and on the other hand on the slope of the ply drop-off.

The average slope of said ply drop-off is substantially between $1/40$ and $1/20$. The slope is preferably around $1/20$ in a direction substantially parallel to the longitudinal or circumferential axis of the panel. It is preferably around $1/40$ in a direction that is substantially oblique with respect to the longitudinal and circumferential axes of the panel.

As shown in FIG. 5, a liner 60 made of composite material, attached to the reinforced skin portion 32 and superposed thereon, is provided on the panel 30. More specifically, the liner 60 is mounted fixedly on the reinforced skin portion 32.

Preferably, the liner 60 is assembled to said reinforced skin portion 32 by co-curing, as described below.

The shape of the liner 60 then corresponds substantially to that of the reinforced skin portion 32, so that there is substantially no empty space between the liner 60 and the reinforced skin portion 32.

The liner 60 is preferably superposed on the first portion 51 of the integrated reinforcement 50, defining with the latter at least part of the contour 41 of the opening 40.

Of course, in a variant embodiment (not shown) in which the first portion 51 of the integrated reinforcement 50 is not present, the liner 60 is superposed on the ply drop-off portion 52 so as to define with the integrated reinforcement 50 at least part of the contour 41 of the opening 40.

Preferably, the thickness of the liner is substantially constant.

It advantageously has a surface area smaller than that of the integrated reinforcement 50 and is preferably located, in the example shown in FIG. 5, in the area of the rounded corners of the opening 40. This is because the corner zones of the opening 40 are the site of a particularly high stress concentration. In addition, the arrangement of the liner in these zones provides the necessary mechanical strength.

In order to ensure the transfer of stresses between the liner 60 and the reinforced skin portion 32, consolidating members 70 are provided which pass at least partially through the liner 60 and at least partially through the reinforced skin portion 32.

They may also participate in attaching the liner 60 to the reinforced skin portion 32.

The consolidating members 70 are preferably members comprising a stem, and advantageously members comprising a stem that can expand radially with respect to the longitudinal axis of the stem. For example, these members may be of the rivet, screw and bolt, stem and crimping ring, or "lockbolt" type.

The consolidating members 70 are advantageously oriented along an axis that is substantially orthogonal, locally, to the surface of the skin 31.

Preferably, the consolidating member comprises a member body which occupies a hole for housing the consolidating member. The member body may pass through the liner and the reinforced skin portion over the entire thickness of these elements.

Advantageously, the contour of the member body is in continuous contact with the wall of the hole, over the entire height thereof.

Figure 6:
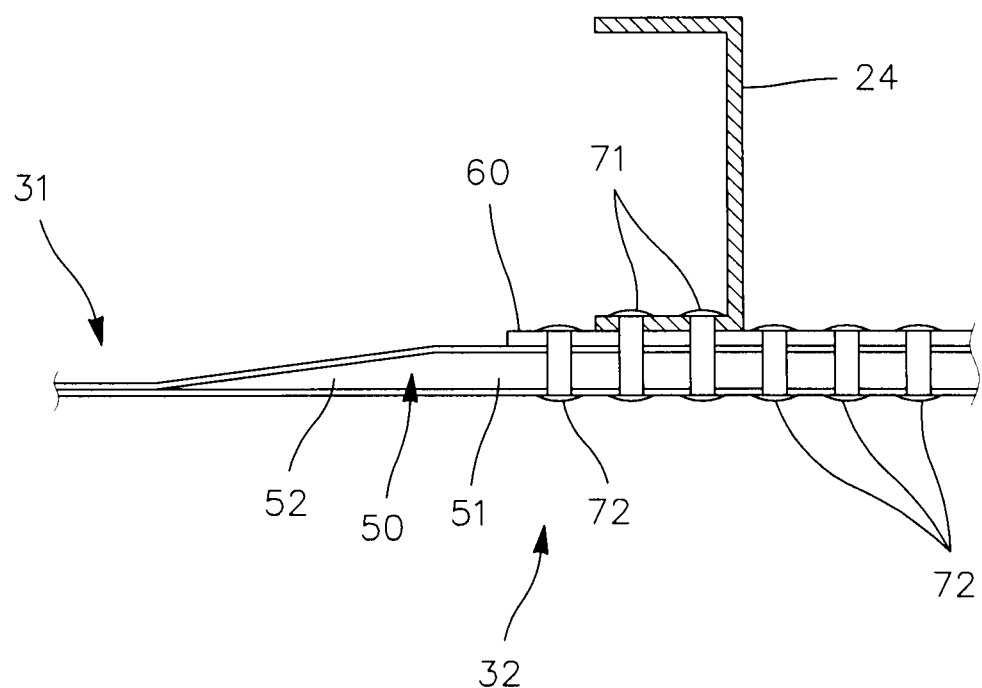
FIG. 6 is a sectional view of the reinforced and liner-equipped fuselage panel, shown along the axis B-B of FIG. 5.

The stresses are thus transmitted from the liner 60 to the reinforced skin portion 32. It is therefore not necessary to provide a ply drop-off for the liner 60. A jump in thickness is then possible between the liner 60 and the reinforced skin portion 32, as shown in FIG. 6. FIG. 6 shows in longitudinal section, along the axis B-B of FIG. 5, part of the reinforced panel 30 equipped with the liner 60.

In one embodiment of the invention, a fuselage portion comprises at least one panel 30, reinforced in this way by the integrated reinforcement 50 and the liner 60, mounted fixedly on structural elements of the fuselage.

These structural elements may be frames, stringers, lintels or longerons.

FIG. 5 shows in dotted line a frame 24 on which the panel 30 is fixedly mounted. The consolidating members then participate in transferring the stresses from the panel 30 to the frame 24.

The frame 24 thus contributes to the mechanical strength provided by the integrated reinforcement 50 and the liner 60, since the forces to which these two elements are subjected are also transmitted into the frame 24 by the consolidating members 70.

Advantageously, these consolidating members 70 are arranged so as to be mounted fixedly on at least one structural element. In FIG. 5, they are mounted on the frame 24 and/or on a door header (not shown) oriented parallel to the longitudinal axis of the panel.

FIG. 6 shows, in section, consolidating members 71 passing through the reinforced skin portion 32 and the liner 60, and mounted fixedly on a structural frame 24. The other consolidating members 72 may pass through the reinforced skin portion 32 and the liner 60. Preferably, some consolidating members are mounted fixedly on a structural lintel (not shown) arranged substantially perpendicular to the frame 24.

The skin 31, the integrated reinforcement 50 and the liner 60 may be formed of a stack of plies of unidirectional fabrics or laps of fibres preimpregnated with an appropriate resin.

Preferably, the fibres and the resin of these three elements are of the same nature.

Depending on the envisaged application, they are selected from the fibres and resins usually used in the field of composite materials. Thus the fibres may be carbon fibres, glass fibres or aramid fibres and the resin may be a thermosetting resin such as a phenolic resin or a resin of epoxy type.

In the preferred embodiment shown in FIG. 5, the skin 31 has a thickness of around 5 mm, the integrated reinforcement 50 has a maximum thickness of around 15 mm and the liner 60 has a thickness of around 5 mm.

Of course, the maximum thickness of the integrated reinforcement 50 and that of the liner 60 may be different, depending on the requirements for reinforcement of the panel 30.

The thicknesses can be optimised by digital simulation of the flows of stresses in the panel 30 thus reinforced.

The panel 30 according to the invention may be produced by a manufacturing method comprising the following steps:
  a step of creating a stack of preimpregnated fibre plies, comprising
    a plurality of plies intended to form a panel skin 31, comprising a first set of plies 31A and a second set of plies 31B,
    one or more plies interposed between the first and second sets of plies 31A, 31B and intended to form said integrated reinforcement 50, the plies of the integrated reinforcement 50 and those of the skin 31 defining together a reinforced skin portion 32, and one or more plies arranged on the plies intended to form said reinforced skin portion 32, and intended to form said liner 60; then a step of consolidating said stack;

said method also comprising the steps of:

installing said consolidating members 70; and trimming so as to form said opening 40.

The first and second sets 31A, 31B of plies may each comprise one or more plies.

Advantageously, during the step of installing the consolidating members 70, a sub-step is provided during which at least part of said consolidating member 70 is expanded radially with respect to its longitudinal axis. This makes it possible to achieve the continuous contact, in at least one section transverse to its longitudinal axis, of the contour of the consolidating member 70 with the wall of the hole for housing said consolidating member 70.

The invention claimed is:

1. A fuselage panel made of composite material comprising:

a skin having an opening, at least part of a contour of the opening is reinforced by an integrated reinforcement made of composite material defining a reinforced skin portion and the integrated reinforcement comprising a first portion having a substantially constant thickness, defining at least part of the contour of the opening, and a second portion having a ply drop-off, extending from the first portion and having a thickness that gradually decreases in a direction away from the first portion such that an average slope of the ply drop-off is between $1/40$ and $1/20$;

at least one liner made of composite material assembled by co-curing to said reinforced skin portion such that said at least one liner is superposed on the first portion of the integrated reinforcement and attached to said reinforced skin portion and participates at least partially in defining the contour of the opening; and consolidating members, oriented along an axis that is substantially orthogonal, locally, to the surface of the skin, each of the consolidating members passing at least partially through said liner and at least partially through said reinforced skin portion, wherein the at least one liner and said reinforced skin portion each includes a same thermosetting resin, and wherein the resin of the liner and the resin of said reinforced skin portion are polymerized to one another in a connection surface area between the liner and said reinforced skin portion.

2. The fuselage panel according to claim 1, wherein a surface area of said liner is substantially smaller than a surface area of said reinforced skin portion forming a support for said liner.

3. The fuselage panel according to claim 1, wherein said liner has a substantially constant thickness.

4. The fuselage panel according to claim 1, wherein, in at least one section transverse to a longitudinal axis of a consolidating member of said consolidating members, a contour of the consolidating member is in continuous contact with a wall of a hole for housing the consolidating member.

5. The fuselage panel according to claim 4, wherein the continuous contact is achieved substantially over an entire length of the consolidating member.

6. An aircraft fuselage portion comprising at least one fuselage panel according to claim 1 and at least one structural element of a fuselage, said consolidating members being mounted fixedly on said at least one structural element of the fuselage.

7. An aircraft comprising at least one fuselage portion according to claim 6.

8. A method of manufacturing a fuselage panel made of composite material having an opening, said method comprising steps of:

creating a stack of preimpregnated fibre plies, comprising a plurality of plies intended to form a panel skin, including a first set of plies and a second set of plies, interposing one or more plies between the first and second sets of plies and forming an integrated reinforcement for the opening such that a ply drop-off of the integrated reinforcement has a thickness that gradually decreases in a direction away from the opening and an average slope of the ply drop-off is between $1/40$ and $1/20$, the plies of the integrated reinforcement and those of the panel skin defining together a reinforced skin portion, arranging one or more plies on the plies forming said reinforced skin portion, and forming a liner made of composite material for the fuselage panel, the liner and the integrated reinforcement each including a same resin;

consolidating said stack so that the resin of the liner and the resin of the integrated reinforcement are polymerized to each other by co-curing;

installing consolidating members passing at least partially through the liner; and trimming so as to form the opening.

9. The manufacturing method according to claim 8, wherein the step of installing said consolidating members comprises a sub-step during which at least part of a consolidating member of said consolidating members is expanded radially with respect to a longitudinal axis thereof so as to achieve continuous contact, in at least one section transverse to the longitudinal axis thereof, of a contour of the consolidating member with a wall of a hole for housing the consolidating member.

10. The manufacturing method according to claim 8, wherein the trimming includes forming the opening with a rectangular shape with rounded corners.

11. The fuselage panel according to claim 1, wherein the resin is a phenolic resin or a resin of epoxy type.

12. The fuselage panel according to claim 1, wherein a maximum thickness of the integrated reinforcement is between 5 mm and 30 mm.

13. The fuselage panel according to claim 12, wherein a maximum thickness of the integrated reinforcement is 15 mm.

14. The fuselage panel according to claim 1, wherein a thickness of the at least one liner is between 5 mm and 30 mm.

15. The fuselage panel according to claim 14, wherein a thickness of the at least one liner is 5 mm.

16. The fuselage panel according to claim 1, wherein the opening has a rectangular shape with rounded corners.

17. The fuselage panel according to claim 16, wherein the at least one liner includes a plurality of liners, a single liner of the plurality of liners being arranged on each of the rounded corners and assembled by co-curing to said reinforced skin portion.

* * * * *